Patented Aug. 6, 1935

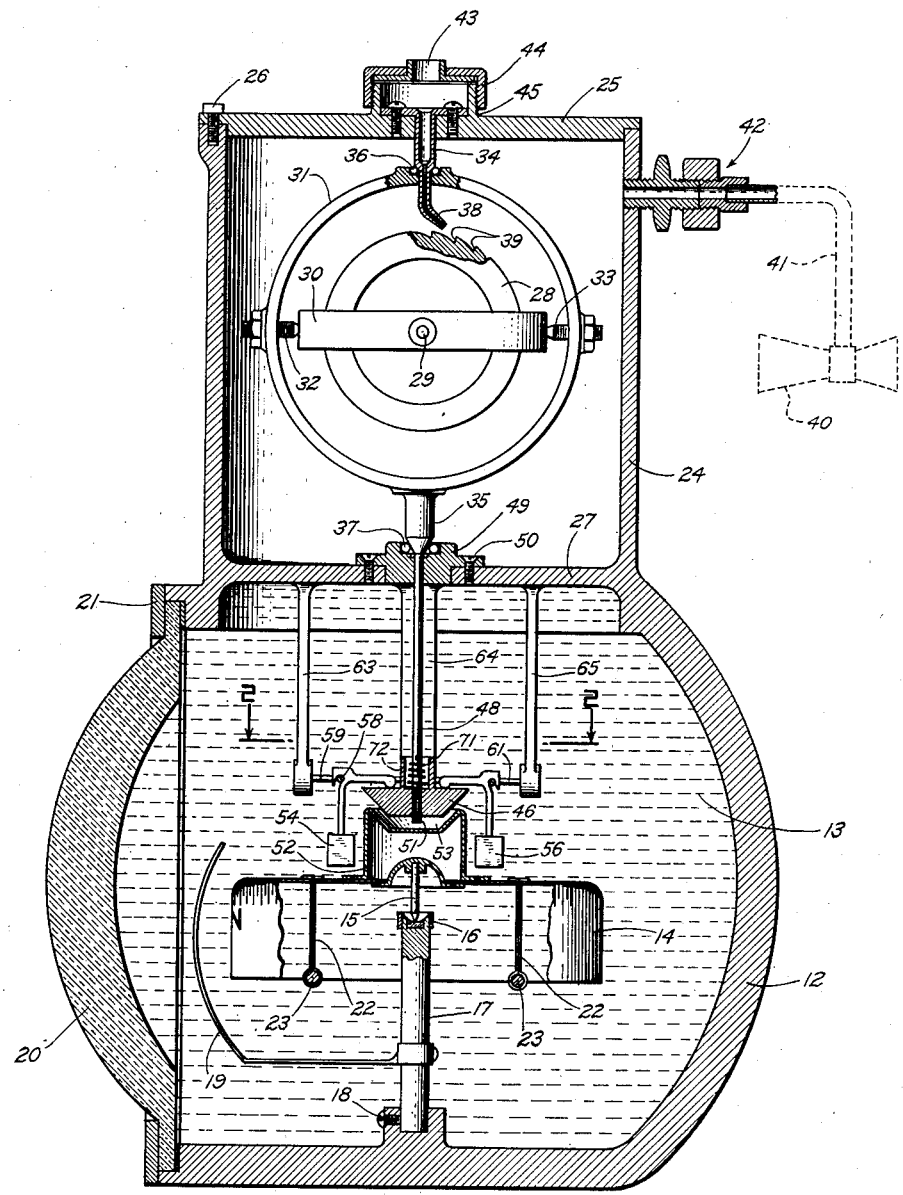

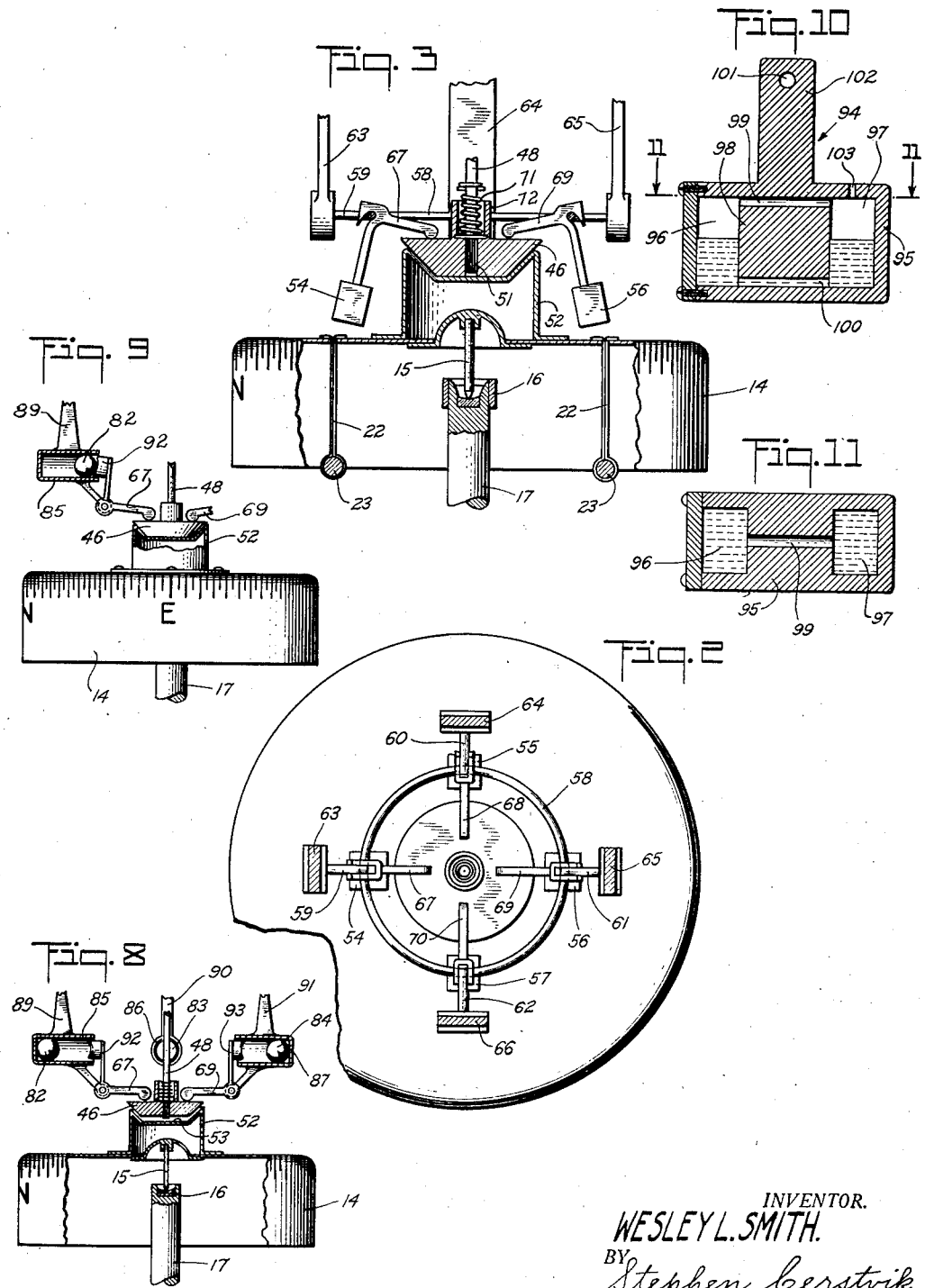

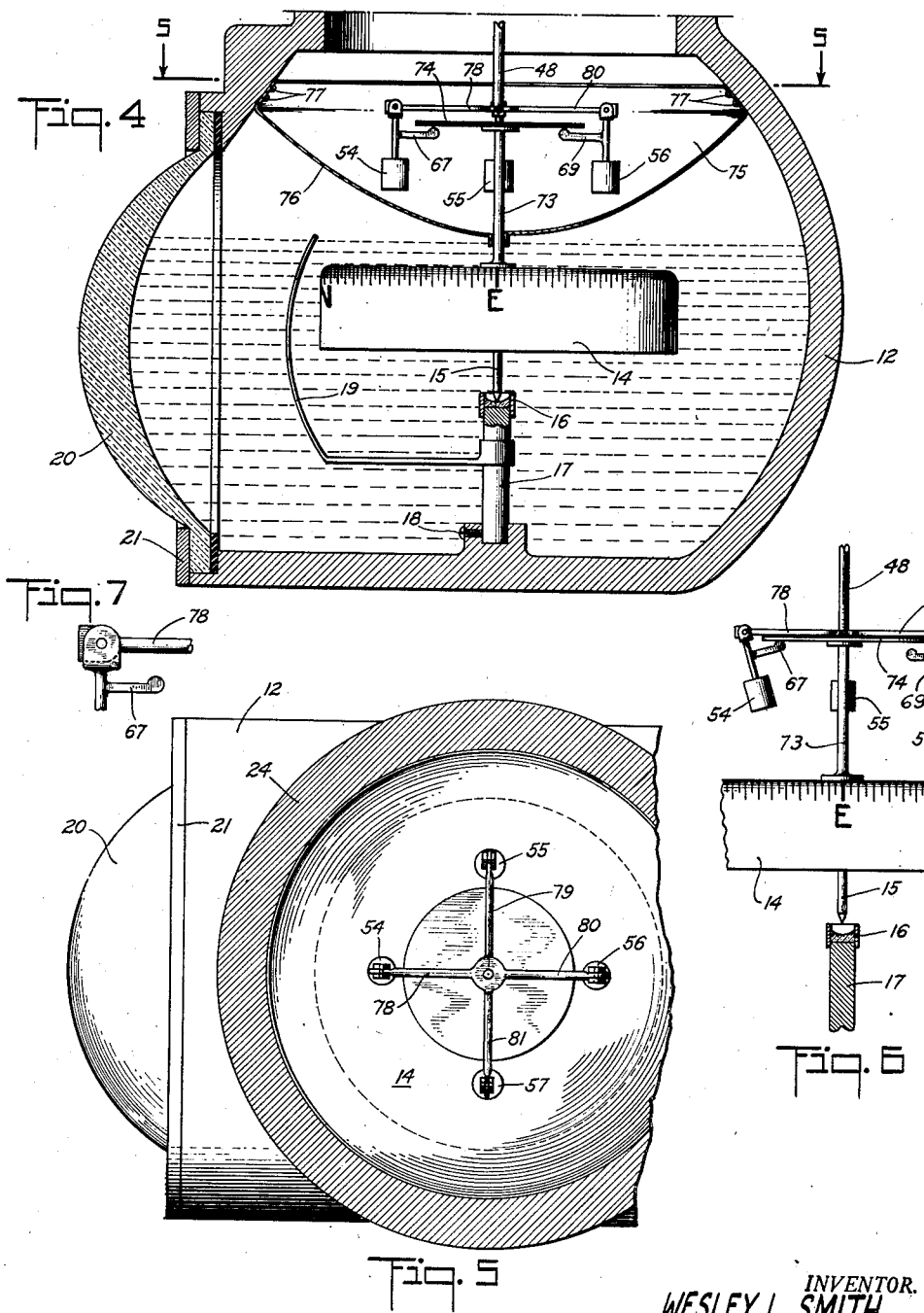

2,010,204

UNITED STATES PATENT OFFICE 2,010,204

GYRO-CONTROLLED MAGNETIC COMPASS

Wesley L. Smith, Cranford, N. J., assignor to Eclipse Aviation Corporation, East Orange, N. J., a corporation of New Jersey Application November 23, 1933, Serial No. 699,435

23 Claims. (Cl. 33—222)

The present invention relates to compasses and, more particularly, to means for controlling a magnetic compass mounted in a vehicle such, for example, as an aircraft.

It has been found that when a magnetic compass of the type having a compass card including magnetic elements carried thereby, pivotally mounted in a compass-bowl for normally free response to the earth's magnetic field, is carried on a fast moving vehicle such, for example, as an aircraft where extremely high acceleration forces, due to changes in speed of the craft, and centrifugal forces, due to turning of the craft about its vertical axis, are present, particularly during violent manœuvres of the aircraft, the compass card is caused to deviate and sometimes is caused to actually spin on its pivot, thereby preventing the pilot of the craft from knowing his compass direction. Such deviation and/or spinning of the compass card may also be caused by movement of the craft about any of its three axes as, for example, when it is pitching, rolling, or turning, or performing any of these manœuvres simultaneously.

In order to avoid the foregoing difficulties, various means have been suggested heretofore. For example, one form of apparatus intended for this purpose is shown in U. S. Patent No. 1,610,931 to Charles H. Colvin, wherein a gyroscope having three degrees of freedom and having its rotor mounted for rotation about a horizontal axis, i. e., an azimuth direction-keeping gyroscope, is secured permanently to the pivoted compass card on top of the latter. Although an arrangement of this type serves its purpose to a limited extent, it is found that the response of the magnetic elements of the compass card to the earth's magnetic field is somewhat constrained by the gyroscopic effect and mass of the gyroscope due to the latter being mounted directly and permanently on the compass card. Another device is disclosed in a co-pending application of Adolf Urfer and Francis A. Wade, Serial No. 615,720, filed June 6, 1932, wherein the compass card is pivotally mounted for normally free response to the earth's magnetic field, and a turn responsive gyroscope or a three-degrees-of-freedom azimuth gyroscope, is mounted separately from the compass card but is adapted, by suitable means, to be clutched to the card, either periodically by a timed mechanism, or by turn responsive means when the craft on which the compass is mounted is turning. In neither of these latter embodiments, however, were means provided for preventing deviation and/or spinning of the compass card due to acceleration and/or centrifugal forces, or due to pitching and/or rolling of the craft.

Accordingly, one of the objects of the present invention is to provide novel means whereby deviation or spinning of a compass card mounted for normally free response to the earth's magnetic field, due to acceleration or centrifugal forces, or due to pitching and/or rolling, is prevented.

Another object is to provide, in combination with a magnetic compass having a compass card pivotally mounted for normally free response to the earth's magnetic field, novel means, including an azimuth gyroscope having three degrees of freedom, whereby, during acceleration of the craft or when the latter is pitching, rolling, or turning, or performing all of these manœuvres at the same time, the gyroscope is effective to hold the compass card in the fixed relation to the earth's magnetic meridian in which it was before the manœuvre was executed, and whereby, after the craft ceases its manœuvres, the card is again submitted to the influence of the earth's magnetic field, thus causing the card to always correctly indicate the direction of the magnetic meridian with respect to the craft.

A further object of the invention is to provide, in combination with a magnetic compass having a compass card pivotally mounted for normally free response to the earth's magnetic field, an azimuth gyroscope having three degrees of freedom and having its rotor axis substantially fixed in space, novel means responsive to acceleration forces, including gravity, for connecting together the compass card and the gyroscope whereby the card is under the sole control of the gyroscope when such forces are acting and whereby the card and the gyroscope are disconnected and the card is again submitted to the sole influence of the earth's magnetic field when the forces have ceased acting.

Still another object is to provide in combination with a magnetic compass of the class described and having a gyroscopic control of the foregoing type, novel means whereby the control is effective only when acceleration forces other than gravity are present and ineffective when the craft on which the compass is mounted inclines about its longitudinal or transverse axis, or both, without accelerating or decelerating.

The above and other objects and advantages of the invention will appear more fully hereinafter from a consideration of the detailed description which follows, taken together with the accompanying drawings wherein four embodiments of the invention are illustrated. It is to be expressly understood, however, that the drawings are for the purpose of illustration and description only and are not designed as a definition of the limits of the invention, reference being had for this purpose to the appended claims.

In the drawings wherein like reference characters refer to like parts throughout the several views:

Fig. 1 is a vertical section of a magnetic compass illustrating one embodiment of the invention;

Fig. 2 is a plan view as viewed along line 2—2 of Fig. 1 showing the top of the compass card and the novel acceleration controlled means for connecting together the gyroscope and the card;

Fig. 3 is a partial view, partly in section, of the compass showing the novel acceleration controlled means of Fig. 1 in operation;

Fig. 4 is another embodiment of the invention, wherein the compass card is clutched to the gyroscope instead of the latter being clutched to the card;

Fig. 5 is a plan view, partly in section, of the embodiment shown in Fig. 4;

Fig. 6 is a partial detail view showing the embodiment of Fig. 4 in operation;

Fig. 7 is a detail view of one of the clutch operating members;

Fig. 8 is a partial view, partly in section, of a further embodiment of the invention;

Fig. 9 is a view similar to Fig. 8 showing the latter embodiment in operation;

Fig. 10 is a vertical section of another embodiment of one of the acceleration controlled elements for operating the clutch and whereby the clutch is operated solely by acceleration forces and not by any inclination of the craft about the horizontal or transverse axis thereof; and Fig. 11 is a sectional plan view of the element shown in Fig. 10 and taken on line 11—11 of the latter figure.

As pointed out hereinbefore, the present invention is directed to the provision of novel means for preventing and/or eliminating errors and deviations in magnetic compasses, particularly those errors and deviations to which a magnetic compass is subject when mounted in a conveyance or vehicle. The invention is especially directed to novel means for controlling a magnetic compass during periods when the vehicle is accelerating or decelerating or turning about its transverse axis or when inclining about the transverse or horizontal axes, i. e., when rolling or pitching, or only when accelerating or decelerating in a straight path and not when inclining about the longitudinal and transverse axis without changing speed.

More specifically, the invention seeks to control magnetic compasses in vehicles so that errors which would ordinarily be produced by changes in speed of the vehicle or by turning of the vehicle about its vertical axis are automatically prevented from registering on the compass indicating means so that the compass will always be oriented substantially correctly at all times regardless of the attitude or motion of the craft. For this purpose there is provided, in accordance with the invention, a magnetic compass having a compass card including magnetic elements carried thereby, which is normally permitted to respond freely to the magnetic influences of the earth's field but which is controlled independently of the earth's field during turning of the vehicle about its vertical axis and/or during changing of speed of the vehicle. In other words, during normal straight-course movements of the vehicle without change in speed, the compass card of the compass receives its orientation from the earth's magnetic field while during turning of the vehicle about its vertical axis or during changes in speed or when the craft is pitching or rolling, the compass card is maintained in correctly oriented relation by interposing an external or non-magnetic control which prevents or compensates for the deviations induced by the turning movements or by the inclination of the vehicle or by changes in speed of the vehicle.

The invention further provides a compass in which the compass card is always oriented substantially correctly and, therefore, may be used for steering a vehicle regardless of the course, the attitude, or the movements of the vehicle, and wherein the correct reading always appears on the same single indicating member, i. e., the compass card or its equivalent.

In the present embodiment, the external or non-magnetic control for the compass is derived from an azimuth gyroscope having three degrees of freedom and having its rotor axis substantially fixed in a horizontal plane. In accordance with the invention, the gyroscopic control is utilized solely during turning of the vehicle about its vertical axis or during changes in speed of the vehicle or when the latter is pitching or rolling, and directly corrects or compensates for the errors and deviations which the foregoing movements would ordinarily create.

The invention is adapted for magnetic compasses generally, especially when used in vehicles or moving conveyances such as ships, land vehicles, and aircraft. Probably the greatest field for the invention is in its application to aerial navigation. The great speed and manœuvorability of airplanes subject their magnetic compasses to serious errors during the rapid changes of course and/or attitude of the plane, frequently giving a compass reading which is temporarily far from the direct magnetic course of the plane. By virtue of the present invention, the compass indicates the true course of the plane at all times regardless of the deviation effects induced by centrifugal forces, angular velocity, acceleration forces and the like.

Referring now in detail to the drawings and, more particularly, to Figs. 1, 2 and 3 wherein one embodiment of the invention is illustrated, there is provided, as illustrated, a magnetic compass of the liquid type comprising a compass bowl 12 containing a suitable damping liquid 13 and within which is mounted a compass card 14 in any suitable manner as by means of a pivot 15 supported in a cup-shaped jeweled bearing 16 carried by a pivot post 17 secured to the bottom of the compass bowl 12 at the center of the latter in any suitable manner as by means of a screw 18. Cooperating with the compass card 14 is an index member or lubber's line 19 carried by the pivot post 17 and extending radially from the pivot post and projecting upwardly in front of the compass card so as to be viewable through a cover-glass 20 secured to the front of the compass bowl in any suitable manner as by means of a clamping ring 21. Carried by the compass card on either side of the pivot 15 by suitable suspension members 22, are two bar magnets 23 whereby the card is influenced and oriented on the pivot post 17 by the earth's magnetic field.

It will be understood that the novel features of the invention are particularly adapted for magnetic compasses employed for steering vehicles especially in aerial navigation. Accordingly, the magnetic compass shown in Fig. 1 is mounted on an instrument panel (not shown) of an airplane with the cover-glass 20 projecting from the panel so that the compass bowl 12 will be mounted with the cover-glass facing the rear of the airplane and the rear of the compass bowl facing the front of the plane, i. e., an axis passing horizontally through the center of the cover-glass to the rear of the bowl, in the plane of the paper, will be parallel to or coincident with the longitudinal axis of the craft. Thus, the compass card 14 will be oriented with respect to the fore-and-aft axis of the airplane and will thereby be effective for direct course laying and steering.

Referring now to the novel means for non-magnetically controlling the movements and indications of the compass card during selected intervals, particularly for the correction and prevention of errors due to changes in speed of the vehicle, or due to centrifugal forces produced upon turning of the vehicle about its vertical axis, or due to inclination of the vehicle about its longitudinal or transverse axes, there are illustrated in the embodiment shown in Fig. 1 means for employing the direction-keeping properties of an azimuth gyroscope for the purposes stated. For this purpose there is secured to or formed integrally with the compass bowl 12, at the top thereof, an auxiliary casing 24 having a suitable cover 25 at the top secured thereto in any suitable manner as by means of screws, one of which is shown at 26. The interior of the casing 24 is separated from the interior of the compass bowl by means of a suitable partition 27 to prevent liquid entering the upper compartment. An azimuth gyroscope is mounted within the casing 24 and is constituted by a rotor 28 mounted for rotation about a horizontal axis 29 in a horizontal gimbal ring 30 which is pivoted in a vertical gimbal ring 31 on a horizontal axis perpendicular to the axis of rotation 29 by means of adjustable pivots 32 and 33, respectively. The vertical gimbal ring 31 is, in turn, mounted for relative angular movement with respect to the casing 24 and compass bowl 12 by means of vertical pivots 34 and 35 journaled in the cover 25 and partition 27 by means of ball bearings 36 and 37, respectively.

Means are now provided for causing the rotation of the gyro-rotor 28 about the axis 29 to impart gyroscopic properties thereto and, in the form shown, said means comprise a pneumatic drive constituted by a nozzle 38 from which a jet of air is directed against a series of turbine buckets 39 provided on the periphery of the rotor 28. Air for driving the rotor may be obtained in any suitable manner as, for example, by a pressure pump or a suction pump, or a Venturi tube, the latter being preferred when the instrument is mounted on an aircraft so that the Venturi tube is carried on the wing of the craft whereby suction is derived due to the flight of the craft through the air. When a Venturi tube is employed, as shown in dotted lines at 40, the latter is connected to the casing 24 by means of a pipe 41 and a coupling device 42. As a suction is produced by means of the Venturi tube 40, air is sucked into the casing 24 through an opening 43 provided in a cap 44 which threadably engages a boss 45 provided on the cover 25 centrally of the latter. The air then passes through the pivot 34 which is made hollow for this purpose and through the nozzle 38 where it is directed against the peripheral buckets 39, and after the air is discharged therefrom it passes through the coupling member 42 and pipe 41 to the Venturi tube 40. Obviously, if pressure be employed instead of suction, a pressure pump (not shown) may be connected to the cap 44 so that air is forced by pressure into the casing through the opening 43, pivot 34 and nozzle 38 and is exhausted through the opening in which the coupling member 42 is located, said coupling member then being dispensed with.

It will thus be seen that when the gyroscope is mounted as shown in Fig. 1 and the rotor 28 thereof is caused to rotate about the horizontal axis 29, the latter will tend to remain fixed in space, i. e., if the casing 24 and hence, compass bowl 12 be inclined about the axis 30—33 or an axis parallel thereto, or if the casing be moved angularly about a vertical axis coincident with the axis 34—35 and with the pivotal axis of the compass card 14, the rotor axis 29 will remain fixed in space. Any inclination of the casing 24 and compass bowl 12 about the rotor axis 29 or about an axis parallel thereto will have no effect on the gyroscope because there is no gyroscopic effect about the rotational axis of a gyroscope, as is well known.

Means are now provided for employing the direction-keeping properties of the gyroscope to hold the compass card fixed in space by linking the gyroscope and card together when changes in speed of the vehicle on which the apparatus is mounted take place, or when the vehicle is turning about a verticle axis, or when the vehicle is inclined about either its longitudinal or transverse axes. In the form shown, said means comprise a conical clutch member 46 carried by a vertical stem 48 secured to or formed integral with the vertical pivot 35 of the gyroscope and extending into the compass bowl through a liquid-tight bushing 49 secured to and within the partition 27 in any suitable manner as by means of screws 50. The conical clutch member 46 is arranged to move axially of the stem 48 but not to rotate relative thereto and for this purpose is splined thereon by means of splines 51. Associated with the conical clutch member 46 is a cooperating clutch member 52 secured to the top of the compass card 14 coaxially with the pivot 15 and the stem 48 and is provided with a conical surface 53 into which the clutch member 46 is adapted to fit, thereby engaging the member 52 and hence the compass card 14. Means are, therefore, provided for moving the clutch member 46 into engagement with the cooperating conical surface 53 and comprise means responsive to acceleration forces or gravity or centrifugal forces, the latter of which are present when the vehicle on which the compass is mounted is turning about a vertical axis. As illustrated, said acceleration or gravity responsive means are constituted by four masses or weights 54, 55, 56 and 57, respectively, (Fig. 2) pendulously suspended from and pivoted on a ring 58 which is carried by studs 59, 60, 61 and 62 secured to or formed integrally with bracket arms 63, 64, 65 and 66, respectively. It will thus be seen that each weight constitutes a small simple pendulum. The arms are secured to or formed integrally with partition 27 and project downwardly into the compass bowl and are so arranged that the ring 58 is supported thereby coaxially with the stem 48, clutch 46, 53 and compass card 14. The pendulous masses or weights 54, 55, 56 and 57 are arranged in pairs to swing in opposite directions in two vertical planes mutually perpendicular to each other, i. e., said weights are caused to fly outwardly of the ring 58 when actuated by acceleration or centrifugal forces or are adapted to move relatively to the ring 58 upon an inclination of the vehicle about either the longitudinal or transverse axis. In other words, if acceleration or centrifugal forces are acting from the right, as viewed in Fig. 1, the weight 54 will move outwardly and if acceleration or centrifugal forces are acting from the left, then weight 56 will move outwardly. On the other hand, if the forces are in a direction from the plane of the paper, as viewed in Fig. 1, the weight 57 will move outwardly and if the forces are in a direction towards the plane of the paper, the weight 55 will move outwardly. If, of course, the forces are acting in two or more of said directions simultaneously, then two or more of the weights will move accordingly. Also, if the casing 12 be inclined to the right about an axis perpendicular to the plane of the paper, relative movement will occur between the weight 56 and its supporting ring 58, thus giving the effect of an outward movement of the weight 56 and if the compass bowl 12 inclines to the left about the same axis, the relative movement will occur between weight 54 and its supporting ring 58, thus giving the effect of an outward movement of the weight 54. Also, if the bowl be inclined in either direction about a horizontal axis in the plane of the paper, as viewed in Fig. 1, the relative movement will occur between either the weight 55 or the weight 57 and the ring 58.

The pendulums or weights 54, 55, 56 and 57 are provided with fingers 67, 68, 69 and 70, respectively, which are adapted to engage the upper part of conical clutch member 46 upon angular movement of either one or more of said weights about their pivots constituted by the supporting ring 58, thus causing said clutch member 46 to be moved axially of the splined stem 48 into engagement with the conical surface 53 of the cooperating clutch member 52 thereby connecting the gyroscope and the compass card together. In order that the clutch 46 be disengaged from the cooperating clutch member 52 after the weights are restored to their normally vertical positions, a tension coil spring 71 is provided which is located within a hollow cylindrical extension 72 of the clutch member 46 and having one end thereof secured to the stem 48 and the other end to the clutch member 46. Upon movement of the member 46 downward by any one or more of the weights 54, 55, 56 and 57, the spring 71 is placed under tension and, as soon as the weights are restored to normal, moves the member 46 away from the cooperating member 52. In Fig. 3 there is shown an operative position of the clutch whereby the compass card 14 is connected to the gyroscope due to component forces acting on the weights 54 and 56 thereby causing these latter to move outwardly and causing their fingers 67 and 69 to move the clutch member 46 into engagement with the cooperating clutch member 52.

Referring now to Figs. 4, 5, 6 and 7 there is illustrated another embodiment of the invention wherein the compass card and the gyroscope (not shown but mounted above the card like in Fig. 1) are connected together by lifting the compass card 14 and its pivot 15 from the cup-shaped jeweled bearing 16. For this purpose a vertical stem 73 is provided which is secured to the compass card and has secured to its upper free end a disc 74 axially thereof and in a plane perpendicular thereto. The pendulous weights in this embodiment are not located within the damping liquid but in an auxiliary chamber 75 formed by a bowl-shaped partition 76 having an annular flange at its periphery whereby it may be secured to the interior of the compass bowl 12 in any suitable manner as by means of pins 77. The bowl-shaped partition 76 is also provided with an opening located centrally at the bottom thereof through which the rod 73 is adapted to extend. The partition 76 makes the interior of the bowl 12 function like an ink-well so that no liquid can flow into the chamber 75 when the bowl is inverted as sometimes happens on an aircraft. For this purpose the volume of the space 75 above the partition 76 should be made equal to the volume of the liquid. Also, in this embodiment the pendulous weights 54, 55, 56 and 57 are not carried by any part of the casing but are pivotally mounted on members 78, 79, 80 and 81, respectively, which are secured to or formed integral with the stem 48 of the gyro-pivot 35 and project axially from the stem in a horizontal plane parallel to the disc 74. The pendulums 54, 55, 56 and 57 are not arranged to move outwardly, as in Fig. 1, but inwardly, and their fingers 67, 68, 69 and 70, respectively, are arranged to engage the disc 74 on the under side thereof whereby, upon inward movement of one or more of the weights, said disc is lifted upwardly thereby carrying with it the compass card 14 by means of the rod 73, thus lifting the card pivot 15 from the cup-shaped bearing 16 and leaving the card under the sole control of the gyroscope. By reason of the fact that the card is connected to the gyroscope, any inclination of the casing 12 about either of two mutually perpendicular horizontal axes, one of which is in the plane of the paper and the other perpendicular thereto and corresponding to the longitudinal and transverse axes of the vehicle on which the compass bowl 12 is adapted to be mounted, will be shown by the card. Also, because of the direction-keeping properties of the gyroscope, the card will remain fixed about its vertical axis and, therefore, any angular movement of the compass bowl 12 about said vertical axis will also be indicated on the compass card 14.

An operative position of the embodiment shown in Fig. 4 is shown in partial view of Fig. 6 wherein the weight 54 is actuated by forces acting from the left as shown in said figure, thus causing the finger 67 to raise the disc 74 and hold it in fixed relation with respect to the axial members 78, 79, 80 and 81 and the stem 48 of the gyroscope. The same effect will be produced by an inclination of the compass bowl 12 to the right about an axis perpendicular to the plane of the paper.

Referring to Figs. 8 and 9, there is shown a still further embodiment of the invention in which the operation of the clutch member 46 is somewhat similar to that shown in Figs. 1, 2 and 3 except that the form and operation of the weights is slightly different. In lieu of the weights 54, 55, 56 and 57 there is provided a corresponding number of metal balls, three of which are shown at 82, 83 and 84 in Fig. 8. These balls are arranged to roll freely within horizontally arranged cylindrical members 85, 86 and 87, respectively, the fourth cylinder not being shown but is located opposite cylinder 86. The fourth ball is arranged in the same manner and opposite the ball 83 in a direction away from the plane of the paper. The four hollow cylindrical members are carried by arms, three of which are shown at 89, 90 and 91, said arms being carried by the partition 27 of Fig. 2 like the arms 63, 64, 65 and 66 shown in said Fig. 2. In this embodiment, if the acceleration or centrifugal forces are acting from the left, then the ball 82 will be caused to roll in its member 85, as shown in Fig. 9, toward the right to engage an arm 92 which is at right angles to the finger 67 and secured thereto or formed integral therewith so that movement of the arm 92 to the right by the ball 82, the finger 67 will engage the conical clutch member 46, thereby moving it downward axially of the stem 48 and into engagement with the conical surface 53 of the cooperating clutch member 52. The finger 69 (Fig. 8) is also provided with an upstanding arm 93 corresponding to arm 92 for operation upon movement of the ball 84 to the left by acceleration or centrifugal forces from the right. The ball 83 and the fourth ball (not shown) operate in the same manner to operate the clutch when acceleration forces are acting in either direction in a plane perpendicular to the plane of the paper. Also, if the compass bowl 12 and the casing 24 are inclined about either of the two mutually perpendicular horizontal axes, corresponding balls will roll in their cylindrical members to operate the clutch in the same manner as the weights shown in Figs. 1 and 3.

Referring now to Figs. 10 and 11, there is shown still another embodiment of the invention, as applied to the form of the weights 54, 55, 56 and 57. In Fig. 10 there is shown a vertical section of one of these modified weights and in Fig. 11 is shown a horizontal section taken along line 11—11 of Fig. 10. The weight is indicated generally at 94 and, instead of being a solid mass, is constituted by a rectangular hollow member 95 within which are formed two chambers, 96 and 97 by means of a separating member 98. The chambers 96 and 97, however, are placed in communication with each other by means of an upper passage 99 and a lower passage 100 formed in the member 98, said passages being relatively small. Within these chambers 96 and 97 there is placed a quantity of some suitable liquid, such as mercury, so as to approximately half-fill said chambers and is permitted to flow slowly from one to the other through the passage 100 upon angular movement of the hollow member 95 about a pivot 101, from which said member is adapted to be suspended by arm 102. An opening 103 is provided at the top of one of said chambers as, for example, chamber 97, so that both of said chambers will be in communication with the atmosphere externally of the member 95. It will be seen that if the weight 95 is moving to the left about the pivot 101, as viewed in Fig. 10, the mercury will slowly rise in chamber 97 and slowly fall in chamber 96 due to the interconnecting passage 100 through which the mercury flows, thereby slowly changing the center of gravity of the whole assemblage of the weight and the air within the chambers 96 and 97 will always be equalized through the opening 103. If four such weights as those shown in Figs. 10 and 11 are substituted for the weights 54, 55, 56 and 57 of the embodiment shown in Figs. 3 and 4 they will be effective to operate the clutch whenever acceleration and/or centrifugal forces act upon the instrument. Those acceleration forces that accompany the inclination of the instrument, as when an aircraft carrying the instrument is inclined in a climb or descent when no acceleration forces due to change in speed may be present after the initial change in position with respect to gravity or the vertical, will cause the pendulums to operate the clutch. The slow shifting of the centers of gravity of the affected pendulums, however, due to the flow of the mercury from one chamber to another, causes said pendulums to swing free of and to release the clutch after the acceleration accompanying the change in position of the aircraft has ceased.

The pendulums, by properly proportioning the connecting passages 99 and 100, are thus made to operate the clutch whenever acceleration forces are present which would disturb the compass card, but to release the clutch after they have ceased, regardless of the relatively small angles through which the aircraft, and hence the instrument, may have changed its position with respect to gravity or the vertical.

For large angles of inclination such, for example, as those greater than 20° with respect to the vertical and/or gravity, the pendulums keep the clutch engaged and the gyro and compass card connected together, inasmuch as no vehicle, including an aircraft, can maintain such a position except for very short periods.

There is thus provided a novel magnetic compass in which deviation or spinning of the compass card due to acceleration and/or centrifugal forces, or due to pitching or rolling, is prevented, and embodying novel means including an azimuth gyroscope whereby, during changes of speed of the craft or when the latter is pitching, rolling or turning, or performing all of these manœuvres simultaneously, the gyroscope is effective to hold the compass card in the fixed relation to the earth's magnetic meridian in which it was before the manœuvre was executed and, whereby, after the craft ceases its manœuvres, the card is again submitted to the influence of the earth's magnetic field, thus causing the card to always correctly indicate the direction of the magnetic meridian with respect to the craft.

Although several embodiments of the invention have been shown and described in detail, various changes and modifications in the form and relative arrangement of the parts, which will now appear to those skilled in the art, may be made without departing from the scope of the invention. Reference is, therefore, to be had to the appended claims for a definition of the limits of said invention.

What is claimed is:

1. In combination, a magnetic compass adapted to be mounted on a vehicle for normally free response to influences of the earth's magnetic field, directional control means normally disassociated from the compass, and means responsive to acceleration and/or centrifugal forces acting on the compass in any direction for connecting the compass and the directional control means together to control the compass during the time such forces are acting, to obviate deviations of said compass which would otherwise be produced by said forces.

2. In combination, a magnetic compass adapted to be mounted on a craft for normally free response to influences of the earth's magnetic field, gyroscopic directional control means normally disassociated from the compass, and means responsive to acceleration and/or centrifugal forces acting on the compass in any direction for connecting said compass and said gyroscopic means together to control the compass during the time that such forces are present, to obviate deviations of the compass which would otherwise be produced by said forces.

3. In combination, a magnetic compass adapted to be mounted on a craft for normally free response to influences of the earth's magnetic field, directional control means normally disassociated from the compass, and means effective upon a change in speed of the craft for connecting the compass and said directional control means together to control the compass during such changes in speed, to obviate deviations of said compass which would otherwise be produced by said changes in speed.

4. In combination, a magnetic compass adapted to be mounted on a craft for normally free response to influences of the earth's magnetic field, gyroscopic directional control means normally disassociated from the compass, and means effective upon changes in speed of the craft for connecting the compass and said gyroscopic means together to control the compass during such changes in speed, to obviate for deviations of the compass which would be otherwise produced by said changes in speed.

5. In combination, a magnetic compass adapted to be mounted on a craft for normally free response to influences of the earth's magnetic field, directional control means normally disassociated from the compass, and pendulous means for automatically connecting the compass and said directional means together upon inclination of the craft about either of its two horizontal axes, or upon the presence of acceleration and/or centrifugal forces due to changes of speed or due to turning of the craft about its vertical axis, to control the compass during such times to obviate deviations of the compass which would be otherwise produced at such times.

6. In combination, a magnetic compass adapted to be mounted on a craft for normally free response to influences of the earth's magnetic field, gyroscopic directional control means normally disassociated from the compass, and pendulous means for automatically connecting the compass and said gyroscopic means together upon an angular inclination of the craft about either of its two horizontal axes, or upon the presence of acceleration or centrifugal forces due to changes of speed or due to turning of the craft about its vertical axis, to control the compass during such times to obviate deviations of the compass which would be otherwise produced at such times.

7. In combination, a magnetic compass adapted to be mounted on a vehicle for normally free response to influences of the earth's magnetic field, directional control means normally disassociated from the compass, and means responsive to acceleration and/or centrifugal forces acting on the compass in any direction, and effective upon inclination of the compass in any direction, for connecting the compass and the directional control means together to control the compass during the time that said acceleration or centrifugal forces are acting, to obviate deviations of said compass which would otherwise be produced by said forces, said means including means effective to limit the period of time during which said compass and directional control means are connected together so that upon inclination of the compass without the presence of acceleration forces said first-mentioned means are effective for a relatively short time only.

8. In a device of the class described, a magnetic compass, a gyroscope normally disassociated from said compass, means for clutching the compass and gyroscope together, and pendulous means for operating said clutching means, said pendulous means including means for causing the former to respond to acceleration forces for predetermined periods of time only, said predetermined periods being sufficiently long so that said pendulous means are effective to operate the clutching means throughout the duration of all acceleration forces except that of gravity.

9. In combination, a magnetic compass, gyroscopic directional control means normally disassociated from said compass, means for clutching the compass and said directional control means together, pendulous means for operating said clutching means, and means for shifting the center of gravity of said pendulous means whereby the latter are effective to operate said clutching means in response to all acceleration forces but upon inclination of the compass about any axis said pendulous means are ineffective to operate said clutching means unless acceleration forces other than gravity are present.

10. In combination, a compass having a compass card pivotally mounted for normally free response to the influences of the earth's magnetic field, a clutch member carried by said card, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about another horizontal axis perpendicular to the first horizontal axis, a second clutch member carried by and rotatable with said vertical gimbal ring and arranged to be moved into engagement with said first clutch member for connecting the gyroscope to the compass card, and pendulous means for moving said second clutch member into engagment with said first clutch member.

11. In combination, a compass having a compass card pivotally mounted for normally free response to the influences of the earth's magnetic field, a clutch member carried by said card, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about another horizontal axis perpendicular to the first horizontal axis, a second clutch member carried by and rotatable with said vertical gimbal ring and arranged to be moved into engagement with said first clutch member for connecting the gyroscope to the compass card, and a plurality of pendulums arranged to swing about different horizontal axes and each having means for moving said second clutch member into engagement with said first clutch member when any one of said pendulums is moved about its axis of suspension by acceleration forces.

12. In combination, a compass having a compass card pivotally mounted for normally free response to the influences of the earth's magnetic field, a clutch member carried by said card, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about another horizontal axis perpendicular to the first horizontal axis, a second clutch member carried by and rotatable with said vertical gimbal ring and arranged to be moved into engagement with said first clutch member for connecting the gyroscope to the compass card, and a plurality of pendulums arranged to swing about different horizontal axes and each having means for moving said second clutch member into engagement with said first clutch member when any one of said pendulums is moved about its axis of suspension by acceleration forces, said pendulums having means for shifting their centers of gravity whereby they are ineffective to operate said second clutch member when they are moved about their axes by gravity only.

13. In combination, a compass having a compass card pivotally supported for normally free response to the influences of the earth's magnetic field, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about a second horizontal axis perpendicular to the first horizontal axis, pendulous means carried by said vertical gimbal ring, and means carried by the compass card and arranged to be operated by said pendulous means for lifting the card from its pivotal support and for clutching it to the gyroscope when said pendulous means are actuated by acceleration forces.

14. In combination, a compass having a compass card pivotally supported for normally free response to the influences of the earth's magnetic field, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about a second horizontal axis perpendicular to the first horizontal axis, pendulous means carried by said vertical gimbal ring, and means carried by the compass card and arranged to be operated by said pendulous means for lifting the card from its pivotal support and for clutching it to the gyroscope when said pendulous means are actuated by acceleration forces, said pendulous means having means for shifting the center of gravity thereof whereby said pendulous means are ineffective to operate said lifting means when actuated by gravity only.

15. In combination, a compass having a compass card pivotally supported for normally free response to the influences of the earth's magnetic field, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about a second horizontal axis perpendicular to the first horizontal axis, and a plurality of pendulums suspended from said vertical ring and arranged to swing about different horizontal axes, and means carried by the compass card and arranged to be operated by said pendulums for lifting the card from its pivotal support and for clutching it to the gyroscope when said pendulums are actuated by acceleration forces.

16. In combination, a compass having a compass card pivotally supported for normally free response to the influences of the earth's magnetic field, a directional gyroscope having a vertical gimbal ring journaled for angular movement about a vertical axis, a horizontal gimbal ring pivotally mounted in said vertical ring for angular movement about a horizontal axis, a rotor mounted in said horizontal ring for rotation about a second horizontal axis perpendicular to the first horizontal axis, and a plurality of pendulums suspended from said vertical ring and arranged to swing about different horizontal axes, and means carried by the compass card and arranged to be operated by said pendulums for lifting the card from its pivotal support and for clutching it to the gyroscope when said pendulums are actuated by acceleration forces, said pendulums having means for shifting their respective centers of gravity whereby they are ineffective to operate said lifting means when actuated by gravity only.

17. In combination, a magnetic compass having a compass bowl and a card pivotally supported in said bowl for normally free response to the influences of the earth's magnetic field, a clutch member secured to said compass card, a directional gyroscope having a rotor mounted for rotation about a horizontal axis and for relative angular movement about a vertical axis coincident with the axis of the compass card, a second clutch member carried by said directional gyroscope and arranged to be moved axially but to be rotated with said gyroscope about the vertical axis thereof, four cylindrical members carried by the compass bowl and arranged radially of the vertical axis of said gyroscope at right angles to each other in a horizontal plane, a weighted ball in each cylinder and adapted to roll therein, and means associated with each cylinder and adapted to be operated by the respective balls when the latter roll therein for moving said second clutch member into engagement with said first clutch member thereby connecting the gyroscope to the compass card for controlling the latter.

18. In combination, a compass having a compass card pivotally mounted for normally free response to the earth's magnetic field, a directional gyroscope normally disconnected from the compass card, and pendulous means responsive to acceleration of the craft on which the compass is carried for connecting the card and gyroscope together.

19. In combination, a compass having a compass card pivotally mounted for normally free response to the earth's magnetic field, a directional gyroscope having three degrees of freedom and normally disassociated from the compass card, a clutch for connecting the card and gyroscope together, and a plurality of pendulums for operating said clutch, each of said pendulums comprising a hollow member having two chambers interconnected by a small passage therebetween, and a liquid in said chambers whereby upon movement of the pendulum about its pivot by gravity, the liquid rises in one chamber and falls in the other to change the center of gravity of the pendulum.

20. In combination, a compass having a compass card pivotally mounted for normally free response to the earth's magnetic field, a directional gyroscope having three degrees of freedom and normally disassociated from the compass card, a clutch for connecting the card and gyroscope together, and a plurality of pendulums for operating said clutch, each of said pendulums comprising a hollow member having two chambers interconnected by a small passage therebetween, and mercury in said chambers whereby upon movement of the pendulum about its pivot by gravity, the mercury rises in one chamber and falls in the other to change the center of gravity of the pendulum.

21. In combination, a magnetic compass, a gyroscopic device normally disassociated from said compass, and means responsive to the acceleration of the craft on which the compass is carried for connecting said compass and device together during the time that said forces are acting.

22. In combination, a magnetic compass, a gyroscope normally disconnected from said compass, and pendulous means for connecting and disconnecting said compass and gyroscope to and from each other for controlling the former by the latter while connected.

23. In combination, a magnetic compass, a gyroscopic device, and pendulous means for so linking said compass and device together when acceleration forces are acting on said compass as to prevent disturbance of the compass element.

WESLEY L. SMITH.